United States Patent
Maida-Smith et al.

(10) Patent No.: US 7,647,627 B2
(45) Date of Patent: Jan. 12, 2010

(54) SYSTEM AND METHODS FOR SECURE SERVICE ORIENTED ARCHITECTURES

(75) Inventors: Kathy J. Maida-Smith, Houston, TX (US); John H. Lindsey, League City, TX (US); Steven W. Engle, Garland, TX (US); Michael J. Nieves, Seabrook, TX (US)

(73) Assignee: Metasecure Corporation, Houston, TX (US)

(*) Notice: Subject to any disclaimer, the term of this patent is extended or adjusted under 35 U.S.C. 154(b) by 46 days.

(21) Appl. No.: 11/465,539

(22) Filed: Aug. 18, 2006

(65) Prior Publication Data

US 2007/0050376 A1   Mar. 1, 2007

Related U.S. Application Data

(60) Provisional application No. 60/711,022, filed on Aug. 24, 2005, provisional application No. 60/806,332, filed on Jun. 30, 2006.

(51) Int. Cl.
    H04L 29/02   (2006.01)
(52) U.S. Cl. .................... 726/12; 726/3; 726/4
(58) Field of Classification Search .............. None
    See application file for complete search history.

(56) References Cited

U.S. PATENT DOCUMENTS

| | | | |
|---|---|---|---|
| 2004/0128546 A1 * | 7/2004 | Blakley et al. | .............. 713/201 |
| 2005/0264581 A1 | 12/2005 | Patrick et al. | |
| 2005/0267892 A1 | 12/2005 | Patrick et al. | |
| 2005/0267947 A1 | 12/2005 | Patrick et al. | |
| 2005/0270970 A1 | 12/2005 | Patrick et al. | |
| 2005/0273497 A1 | 12/2005 | Patrick et al. | |
| 2005/0273502 A1 | 12/2005 | Patrick et al. | |
| 2005/0273516 A1 | 12/2005 | Patrick et al. | |
| 2005/0273517 A1 | 12/2005 | Patrick et al. | |
| 2005/0273518 A1 | 12/2005 | Patrick et al. | |
| 2005/0273520 A1 | 12/2005 | Patrick et al. | |
| 2005/0273521 A1 | 12/2005 | Patrick et al. | |
| 2005/0273847 A1 | 12/2005 | Patrick et al. | |
| 2005/0278335 A1 | 12/2005 | Patrick et al. | |
| 2005/0278374 A1 | 12/2005 | Patrick et al. | |
| 2006/0005063 A1 | 1/2006 | Patrick et al. | |
| 2006/0007918 A1 | 1/2006 | Patrick et al. | |
| 2006/0021017 A1 * | 1/2006 | Hinton et al. | ................. 726/10 |
| 2006/0031353 A1 | 2/2006 | Patrick et al. | |
| 2006/0031354 A1 | 2/2006 | Patrick et al. | |
| 2006/0031355 A1 | 2/2006 | Patrick et al. | |
| 2006/0031431 A1 | 2/2006 | Patrick et al. | |
| 2006/0031432 A1 | 2/2006 | Patrick et al. | |
| 2006/0031433 A1 | 2/2006 | Patrick et al. | |
| 2006/0031481 A1 | 2/2006 | Patrick et al. | |

(Continued)

OTHER PUBLICATIONS

Brose, "A Gateway to Web Services Security—Securing SOAP with Proxies", 2003, Retrieved from the Internet on Nov. 1, 2007: <URL: http://www.springerlink.com/content/4p75u3avn2n0u55n/fulltext.pdf>.*

(Continued)

*Primary Examiner*—Minh Dinh
(74) *Attorney, Agent, or Firm*—Conley Rose, P.C.

(57) ABSTRACT

Provided is a method for intercepting a message between a requesting web service and a source web service, validating the message, logging the result of the validations, and adding a security profile to the message. The method may also include examining the message to determine whether a security profile is embedded therein. If the message is valid, access to the message by the requesting web service is permitted. If the message is not valid, access to the message by the requesting web service is prevented.

17 Claims, 5 Drawing Sheets

U.S. PATENT DOCUMENTS

| | | |
|---|---|---|
| 2006/0031930 A1 | 2/2006 | Patrick et al. |
| 2006/0034237 A1 | 2/2006 | Patrick et al. |
| 2006/0069791 A1 | 3/2006 | Patrick et al. |
| 2006/0080419 A1 | 4/2006 | Patrick et al. |
| 2006/0136555 A1 | 6/2006 | Patrick et al. |
| 2007/0124797 A1* | 5/2007 | Gupta et al. .................... 726/1 |

OTHER PUBLICATIONS

Fontana, "Reactivity enhances Web gateway OS—XOS 4.1 can boost throughput, adds support for SAML-based security tokens", Network World, Nov. 2004, Retrieved from the Internet on Nov. 1, 2007: <URL: http://www.networkworld.com/news/2004/110804reactivity.html>.*

Windley, "Closing the XML security gap—XML firewalls monitor traffic and look for trouble, offering hope for application security", Info World, Oct. 2003, Retrieved from the Internet on Nov. 3, 2007: <URL: http://www.infoworld.com/article/03/10/17/41TCxmlfire_1.html>.*

"Xtradyne White Paper—Protecting Web Services with the XML/SOAP Security Gateway", Prism Tech, Jun. 2004.*

"RSA ClearTrust Ready Implementation Guide for Web Services Applications", Dec. 2004, Retrieved from the Internet on Nov. 1, 2007: <URL: http://www.rsa.com/rsasecured/guides/cleartrust/VordelSecure3x_CT552.pdf>.*

"Assertions and Protocol for the OASIS Security Assertion Markup Language (SAML)", OASIS, May 2002, Retrieved from the Internet on Nov. 1, 2007: <URL: http://www.oasis-open.org/committees/security/docs/cs-sstc-core-01.pdf>.*

Tschofenig et al., "Using SAML for SIP", Jul. 2004, Retrieved from the Internet on Jan. 3, 2009: <URL: http://www.softarmor.com/wgdb/docs/draft-tschofenig-sip-saml-00.html>.*

International Preliminary Report on Patentability for International Application No. PCT/US2006/032530, dated Mar. 26, 2009, 5 pages.

* cited by examiner

SYSTEM AND METHODS FOR SECURE SERVICE ORIENTED ARCHITECTURES

PRIORITY

This application claims priority to U.S. Provisional Patent Application Ser. No. 60/711,022, filed Aug. 24, 2005, entitled "Secure Service Oriented Architecture," and to U.S. Provisional Patent Application Ser. No. 60/806,332, filed Jun. 30, 2006, entitled "Secure Service Oriented Architecture," each of which is incorporated by reference in its entirety.

BACKGROUND

The term Service Oriented Architecture ("SOA") refers to a software architecture that defines the use of services to support requirements of software users. In a SOA environment, each node on a network (e.g., an Internet or intranet) makes its resources available to other nodes as independent services that users may access and use in a standardized way. In this way, functions and data may be shared across a distributed network. SOAs thus comprise loosely coupled, interoperable services that are independent of the underlying logic, so that, for example, a C Sharp-based service may be used by a Java application, and vice versa.

The flexibility and interoperability of SOAs, however, result in compromised security. For example, managing ownership and changing versions of resources as various users access them can be complicated. Likewise, tracking, auditing and controlling access to resources may be desirable. Thus, there is a need for systems and methods of securing a SOA.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
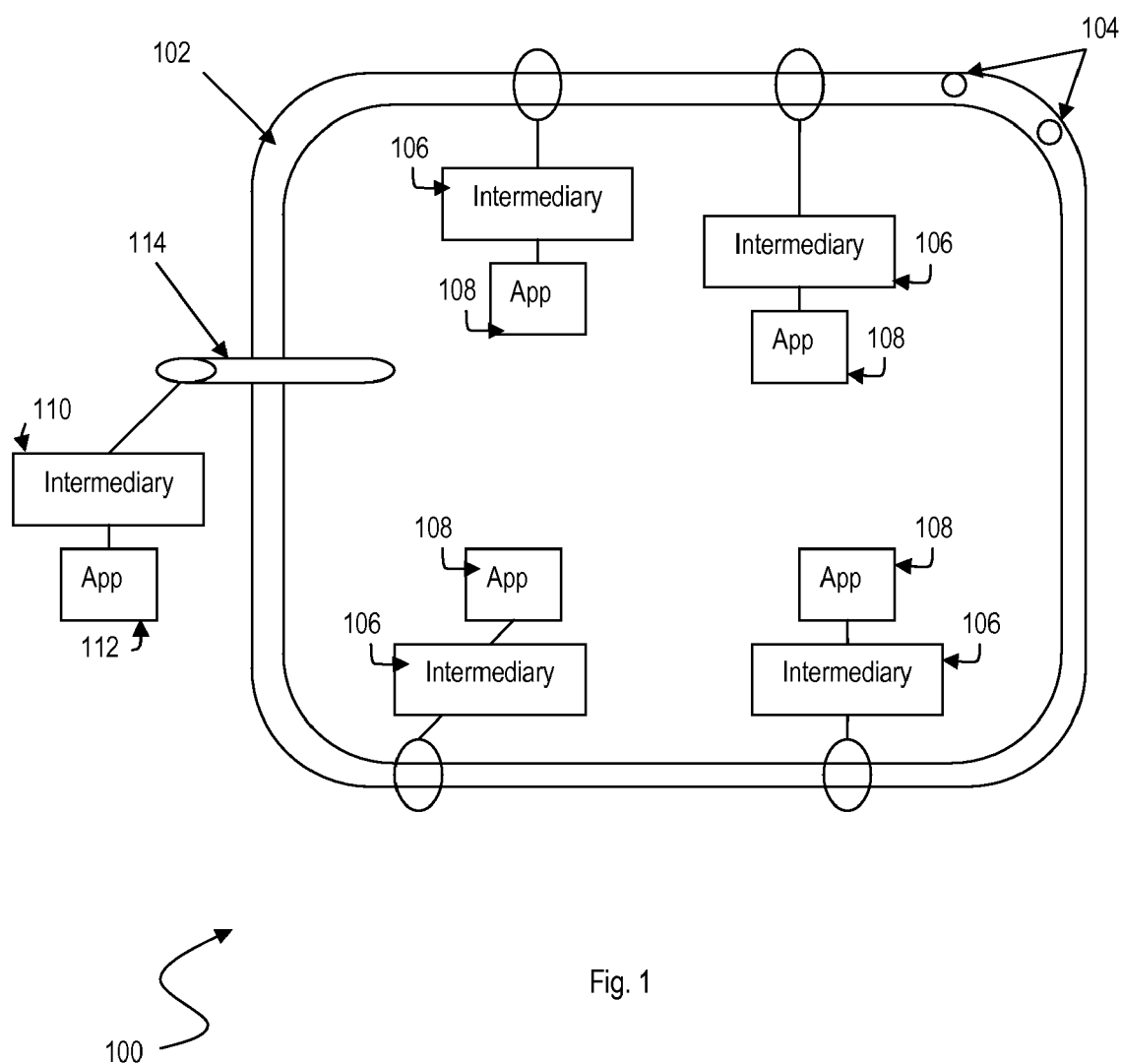
FIG. 1 shows a block diagram of a secure service oriented architecture environment in accordance with the present disclosure.

Certain terms are used in the following description and claims to refer to particular system components. As one skilled in the art will appreciate, computer or software companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

SOA Concepts

Generally speaking, a web service is a web-based application designed to support interoperable machine-to-machine interaction over a network such as the Internet or an Intranet. Other systems or services may interact with a given service in a manner prescribed by its interface by the use of messages. In various embodiments, such messages may be encapsulated in a SOAP message, and may be conveyed using HTTP.

Simple Object Access Protocol ("SOAP") is a message based protocol based on XML for accessing services on the network. SOAP can be used to implement a SOA environment.

Each web service further implements a public interface described in Web Services Description Language ("WSDL"). The interface is an XML-based service description on how to communicate using the given web service.

Web service information is published using a standard protocol referred to as Universal Description, Discovery Integration ("UDDI"). The UDDI enables applications to automatically discover, and/or look up web services information in order to determine whether to access and invoke them, analogous to the manner in which a Yellow Pages phone book enables users to discover business services and how to access them. The UDDI registry indicates, for each service on the network, 1) the identity of the service, the Uniform Resource Locator ("URL") of the service, and what the service does.

Discussion of Alternatives in SOA Environment Security

In various alternatives, security components are implemented using Secure Sockets Layer ("SSL"), Public Key Infrastructure ("PKI"), and firewalls for electronic commerce systems operating over Hyper Text Transfer Protocol ("HTTP"). SSL is a technology that allows web browsers and point-to-point web servers to communicate over a secure connection. SSL addresses authentication in that the server presents the browser with a set of credentials in the form of a server certificate, which is used to verify that the site is what it claims to be. SSL also addresses confidentiality in that SSL responses are encrypted so that third parties cannot decipher the data as it passes between the client and server on a network. Finally, SSL addresses integrity of data—SSL guarantees that data is not modified as it is being passed between the client and server on a network.

A service may be provided indirectly to a user. In an SSL secured environment, a user accesses a distributed site, and the site has a system that invokes remote services. Many services might be deployed in such fashion. In this environment, there are two security contexts: between the user and the web site (an HTTP/SSL transfer), and between the user and the web service (a SOAP transfer).

The second security context (i.e., between the user and the web service) may be referred to as persistent security. The second security context controls the security of the SOAP request/reply message (between the site and the service) to ensure security over more than one client-server connection. In other words, there is a need for persistent message security for SOAP messages, for which SSL is inadequate. While SSL encrypts the data stream, it doesn't support end-to-end confidentiality; it leaves the data exposed between the site and the service provider.

Furthermore, SSL has several limitations when it comes to handling services. SSL provides point-to-point security or operates between end-points (and not applications), but for securing services, end-to-end security is necessary because multiple intermediate nodes could exist between the two end-points. In a SOA environment, there could be multiple XML-based business documents going through multiple intermediary nodes, and using only SSL, it will be difficult for such nodes to participate in security operations in an integrated fashion. Additionally, SSL operates at the transport level and not at the message level. In other words, messages are protected only while in transit. A message cannot be saved to later prove that it has not been modified. Furthermore, SSL does not support non-repudiation. Using SSL, a communicating partner cannot prove that another party has performed a particular transaction. In other words, SSL doesn't support an end-to-end audit trail from service request to service response. Finally, SSL does not support element-wise signing and encryption. Given a large XML order document, it may be desirable to only sign or encrypt part of the information, such as, for example, the credit card info. Encryption of only a portion of a message is difficult in SSL, because SSL is a transport-level security scheme as opposed to a message-level scheme.

Overall

The present disclosure enables security to be embedded in every component of the basic SOA concept described above. Each service defined has a security profile to establish how the service is regulated. Each defined user, as well as all privileges afforded to each member of established groups of users, has an associated security profile. Additionally, the data defined and related characteristics have assigned a security profile. By implementing these three variations on the security profile and embedding them in a security profile that conveys what actions/services are allowed on an SSOA, web service interoperability is achieved that is secure beyond what has been achievable using the alternatives.

A System Embodiment in Accordance with the Present Disclosure

Referring now to FIG. 1, a block diagram is shown illustrating a secure SOA environment in accordance with embodiments of the present disclosure. In network 100, a data bus 102 moves SOAP messages 104 between web services in the network, enabling the web services to make use of each of the others. Various web services 108 within a node are coupled to the data bus 102 and each other, as well as to web services 112 outside the local network 114. The web services 108 may comprise numerous different applications, or various instances of a same application.

Each web service 108, 112 is coupled to the data bus 102 by an intermediary 106, 110. The intermediary 106, 110 may be implemented in software that incorporates a data dictionary engine, and enables a user to register, define, and thereby control the data. The intermediary 106, 110 may also be generally referred to as a data dictionary engine. The intermediary 106, 110 enables dynamic visibility into data as it moves between web services, including what the data is, who owns and controls the data, what version is in circulation, who is permitted to access and use the data, and where the data has been and is going.

In various embodiments, the intermediary 106, 110 injects a security artifact or profile in each SOAP message 104 that travels between web services. As the SOAP message 104 passes to other web services, the intermediary associated with each web service examines the message for the security profile to determine whether a requesting, receiving web service may have access. Each intermediary is operable to communicate with each other intermediary in a fashion that is transparent to the web services and/or users.

The network 100 may be managed according to defined "states" by identifying and tracking (through the intermediaries) each and every activity within the network 100. Each activity involving data in the network is assigned a Globally Unique Identifier. The activities add to a security profile, and the security profile itself, including the creation, identification, transportation, and processing of data are security artifact objects. Each object has a unique tag, and the tag is unique based on a multi-part structure that provides for a unique identifier administered by a registration process that occurs in the intermediary 106, 110. In addition, because an object belongs to a class and any given class may have many instances, in the intermediary 106, 110 the instances are given unique version identifiers used to identify the version. In this fashion, the multi-part structure also stores the version number that, in conjunction with the class identifier, provides for a unique global object instance identifier. The multi-structure identifier also has a geopolitical identifier that is an additional unique structure for the purpose of identifying an organization that may have political boundaries as defined by the user. The geopolitical identifier thus conveys the concept of ownership. The geopolitical identifier may be used for export control compliance and other political conditions necessitating retention of specific control designation at the identifier level.

The management of these security profiles is accomplished with the use of a data dictionary and tag registry within each intermediary 106, 110. All metadata maintained by the data dictionary as well as instance data identified by Globally Unique Identifier tags are driven by the object-oriented architecture and implemented using a data dictionary engine.

The data dictionary engine is a database-embedded engine that contains a data dictionary for metadata; it has as a set of components and services that are designed to define, identify, manage, expose, and archive security objects. Objects in the engine have an intrinsic representation based on entities and relationships between entity types. These entities form a database design containing: Object Class, Data Class, Action Class, Behavior Class, Relationship Class, Object Instance, and Data Instance. Each class is supported by a class tree with inheritance, refinement, and sub-classing rules established and refined by an expert user (Data Architect). Data Instance and Object Instance are instantiations of classes and represent the embodiment of the real world as framed by the class imposed architecture.

A class tree defined by the database design represents business processes supporting a security profile and business data containing security information. When these business processes and data definitions change, the changes are then captured by modifications to the class tree in the intermediary 106, 110.

The data dictionary engine of the intermediary 106, 110 provides the functionality to establish, preserve, and evolve the definition of all class trees and instances. It is used to drive and support the functionality of a metadata repository, such that one instance of a metadata repository (i.e., within a single intermediary) is operable to elaborate a security policy and project a security policy of an enterprise onto a security profile embedded in data messages and services. Each instance of a data dictionary engine can communicate with another data dictionary engine (i.e., between instances of the intermediaries) for the purpose of exchanging information and functionality as defined by the class architecture. The class architecture is thus the method of defining what the data dictionary engine will operate on, and with, to achieve business security objectives that are orchestrated by an administrative function. Within the enterprise, an administrative function performs the task of configuring the class tree, and thus the data dictionary engine.

Figure 2:
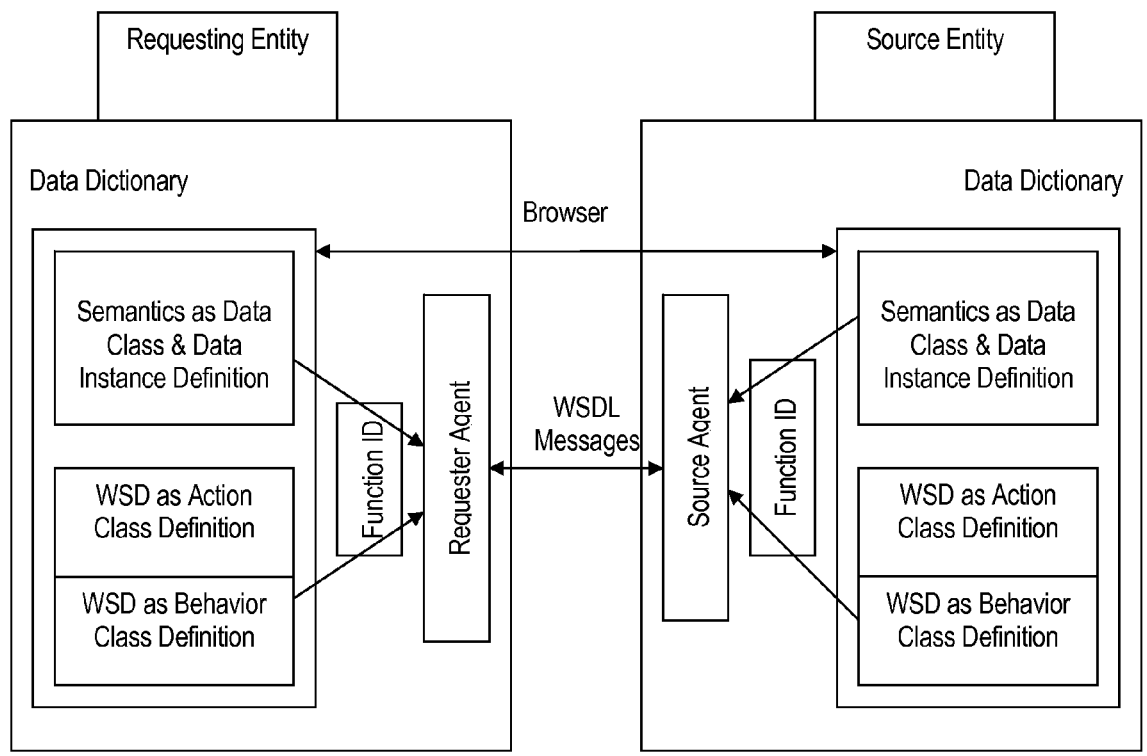
FIG. 2 shows a block diagram of the data dictionary engine of the intermediary in an exemplary embodiment.

As illustrated in the block diagram of FIG. 2, the data dictionary engine of each intermediary establishes a platform for the definition and collection of business security profiles and models that, in turn, establish the domain (area of emphasis) for class tree elaborations. The security domain is thus established as part of the class tree configurations. The data dictionary engine of the intermediary processes object and class information, providing the ability to identify, collect and manage specific security information throughout an "end-to-end" security model.

Each security profile embedded by the intermediary is a managed object instance, belonging to a parent class that is in the business security class tree consistent with enterprise level security profiles.

The security profiles embedded at the data-level maintain a security profile with a corresponding security profile designator. The security profile includes at least three types of information assignments: the data security profile, the user security profile, and the service security profile. The security profile comprises a set of encoded permissions, privileges, and selected quality hierarchy according to the three types of information.

The Data Security Designation may consist of one of the following designations: Source-of-record ("SOR"), clone ("C"), persistent ("P"), and temporal ("T"). The Services Security Designation may consist of one of the following designations: generate ("G"), destroy ("D"), consume ("C"), provide ("P"), request ("R"), own ("O"), and archive ("A"). The User Security Designation may consist of one of the following designations: own ("O"), read ("R"), write ("W"), delete ("D"), proxy-for ("PF"), proxy-to ("PT"), execute ("E"), keep ("K"), subclass ("S"), and archive ("A"). Each designation may be selected by the owner of data upon making it available on the network 100.

Activity associated with each and every profile may be tracked (by the intermediaries) throughout the life cycle of process and data, thereby accomplishing management at the system level. This management of a security profile at the system level is defined by the articulation of a security policy. The articulation of a policy may be accomplished by class tree elaboration, bringing the existence of policy profiles into relationship with IT infrastructure artifacts and data resource artifacts.

Each class instance includes details about ownership, permissions and authority for interaction with other class instances. At each interaction, security profile verification is conducted for compatibility (i.e., a comparison is performed between security profiles), thus allowing the interaction to complete as defined. If the interaction is not supported because of security profile violations, then the is tracked, logged and processed according to the violation class.

Each message (containing the security profile) is composed of at least two artifacts: the data artifact containing the XML elements, attributes, and associated XML articulations constituting a valid XML document, and the security profile artifact also articulated as a valid XML document. The security artifact also contains the artifact identifier and other naming and version control components that identify the artifact as it exists at the enterprise level.

A Method Embodiment in Accordance with the Present Disclosure

Figure 3:
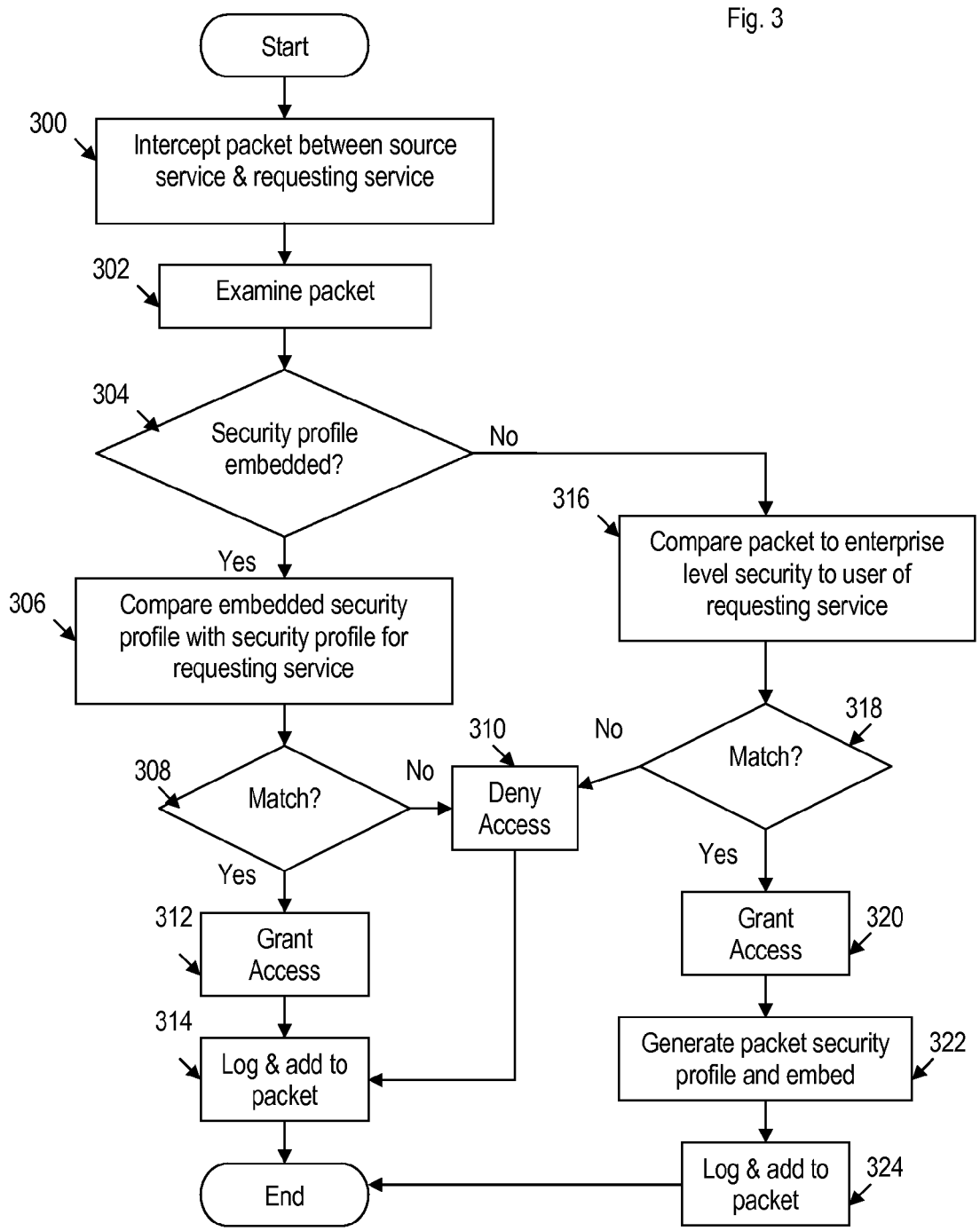
FIG. 3 shows flowchart illustrating a method for securing a service oriented architecture in an exemplary embodiment.

Referring now to FIG. 3, a flowchart is shown for a method of securing a service oriented architecture, in accordance with various embodiments of the present disclosure. The method starts as a message is intercepted between a source service and a requesting service (block 300). As discussed above, the message may comprise a SOAP message. The message may be intercepted at an intermediary, as discussed above, wherein the intermediary is associated with either the source service or the requesting service. The intermediary that intercepts the message examines the message (block 302). Examining the message may occur at the XML level, which involves examining the message for XML-level threats without examining the actual contents of the message, or examining the message may occur at the data-level, delving into the contents of the message.

The intermediary that intercepted the message analyzes the message to determine whether a security profile is embedded in the message (block 304). If a security profile is embedded in the message, then the method proceeds to compare the embedded security profile with a security profile associated with the requesting service (block 306). The intermediary analyzes whether the comparison is a match (block 308), i.e., whether the data security designation, the user security designation, and the service security designation from the embedded profile in the message is the same as those designations of the requesting service. If the comparison is not a match, then the intermediary denies the requesting service access to the message (block 310).

If the comparison is a match, then the intermediary grants access for the requesting service to the message (block 312). The activities, including examining the message, performing the comparison, and granting access, are logged and added to the security profile embedded in the message such that an audit may be performed after the fact to determine who has had access to what and when (block 314).

Returning to block 304, if there is not a security profile embedded in the message (for example, when the message comprises an outbound, newly generated message that was generated at the source web service), the intermediary compares the message to an enterprise level security to authenticate the user associated with the requesting web service (block 316). If the user associated with the requesting web service cannot be authenticated at the enterprise level in a comparison at block 318, then the intermediary denies access for the requesting web service for the message (block 310). If the user associated with the requesting web service can be authenticated at the enterprise level in a comparison at block 318 (i.e., as being an approved user for the network), then the intermediary grants access for the requesting web service for the message (block 320). Additionally, the intermediary polls the owner of the data in the message to obtain information to generate a security profile (including a data security designation, a user security designation, and a service security designation), and generate a security profile for the message, which is embedded in the message (block 322). Finally, the activities, including examining the message, performing the comparison to authenticate the user at the enterprise level, and granting access, are logged and added to the newly generated security profile embedded in the message such that an audit may be performed after the fact to determine who has had access to what and when (block 314).

Various Policy Benefits

To meet the numerous legal, statutory, and regulatory requirements for data privacy, corporate governance reform, and like initiatives, an understanding of the actual messaging data beyond security policy and requirements is necessary. This understanding comes in the form of information on the as-designed data flows of each process executing in the SOA environment, and information derived from the architecture and design of each process. With this information incorporated into the data dictionary engine of the intermediary in the form of process, service, and message objects and classes, and thus incorporated into the security profile objects and classes, the security controls can perform messaging protection, control, and auditing functions within the context of the expected messaging behavior amongst services, instead of merely basing actions on the contents of message payload and header, blind to the context in which this message is being transacted.

Illustrative Use Cases

Figure 4:
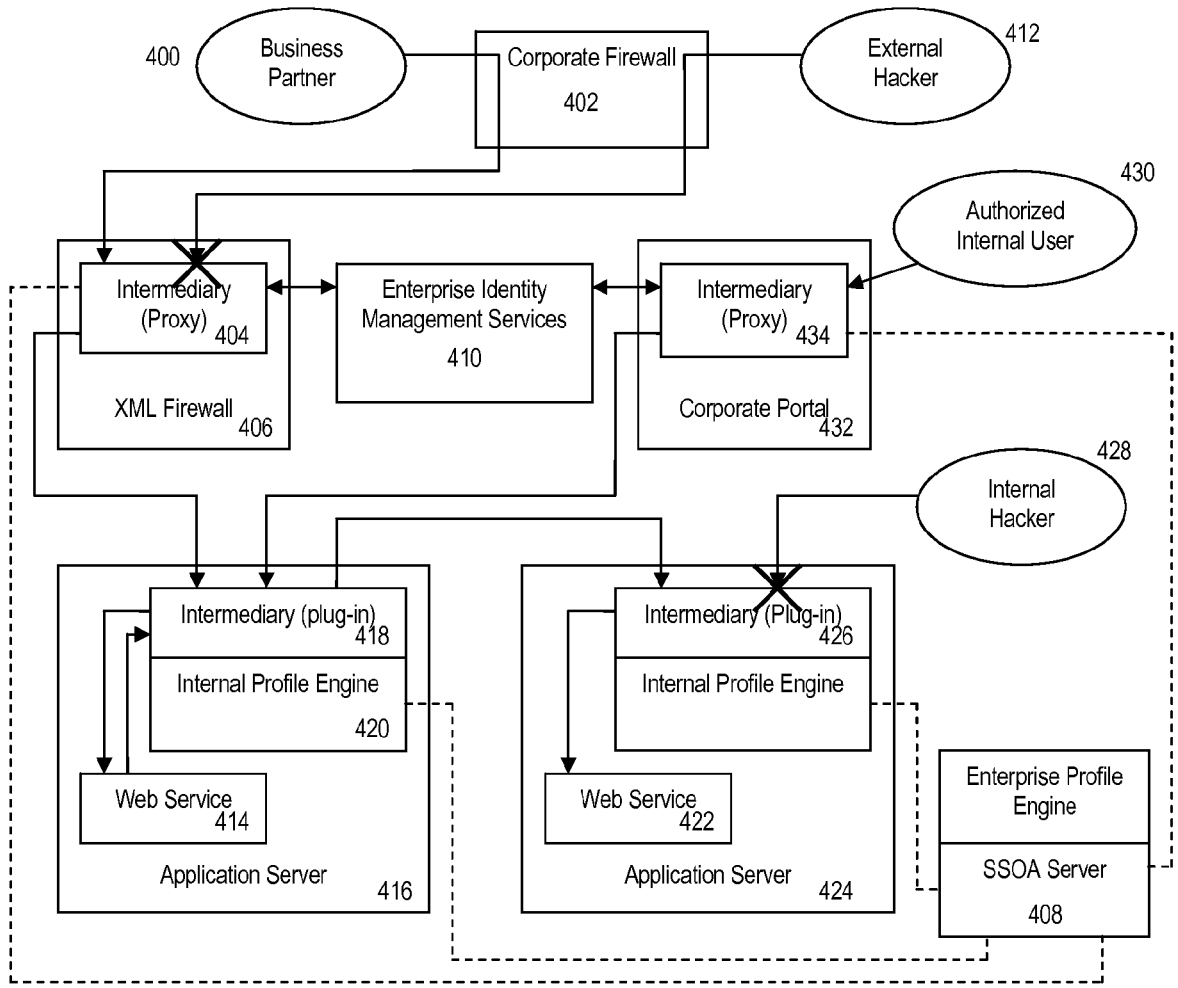
FIG. 4 shows a block diagram illustrating various illustrative use case data flows in accordance with the present disclosure.

Referring now to FIG. 4, a block diagram illustrating various use cases is shown. In a first illustrative use case, a business partner 400 sends an untrusted XML message across a corporate firewall 402 to an intermediary 404 in a Proxy implemented in an XML firewall or proxy appliance 406. The untrusted message is assessed by native capabilities inherent in the XML firewall or proxy appliance 406 for XML-level threats (i.e., the message is examined without actually examining the message's contents). The intermediary 404 in the Proxy then assesses the validity of the message by inquiring at the enterprise level intermediary, via the SSOA Server 408 shown in FIG. 4, wherein the message is examined at the message level for the data, service, and user security profile for the message, the identity of the destination service, and the identity of the invoking user. The message is denied if the security profile is not consistent, i.e., the requested combination of user, data and service is not recognized or authorized. If the security profile is consistent, the intermediary 404 in the Proxy accesses Enterprise Identity Management Services 410 to conduct authentication of the invoking user. Upon determining that the message is, in fact, legitimate based on the authentication of the user, the intermediary 404 in the Proxy creates, signs, timestamps, and injects a token which includes the security profile and other information, into the message as it continues downstream. The intermediary 404 in the Proxy may also add the activities with respect to the message to a log (and add the log to the embedded security profile) and perform an audit, according to the configured policy and/or systems management.

In a second illustrative use case, a hacker 412 attempts to send an unauthorized or malicious message across the firewall 402 to the intermediary 404 in the Proxy. As in the previous example, the message is assessed by the inherent capabilities of the XML firewall or proxy appliance 406 to determine whether the message contains or invokes an XML-level attack (i.e., the message is examined without actually examining the message's contents). If an XML-level attack is detected, the attack is logged, and the intermediary 404 in the Proxy rejects the message, thereby thwarting the attack. If the intermediary 404 in the Proxy determines that the message is not a direct XML-level attack, the intermediary 404 in the Proxy evaluates the message at the data-level, as discussed above, by inquiring at the enterprise level intermediary, via the SSOA Server 408, to retrieve the data, service, and user security profile for the message, as well as the identity of the destination service, and the identity of the invoking user. The intermediary 404 in the Proxy denies the request, given that the user security profile for the attacker is not consistent with the security profile of the message. The data-level inquiry and the resulting denial of the request are logged along with the attributes of the denied message.

In a third illustrative use case, the intermediary 404 in the Proxy routes a trusted XML message inbound to a web service 414 that resides on a application server 416. The application server 416 may be a standard commercial, off-the-shelf server. A software plug-in 418 (i.e., the intermediary) deployed in the application server 416 intercepts the message and validates the injected security profile embedded in the message, and compares it against an instance of the profile stored in the intermediary 418. Each intermediary 418 includes an Internal Profile Engine 420 (i.e., data dictionary) populated with the users, messages and data profiles within its visibility, as determined by the enterprise security profile. If the message is successfully validated against the stored profile in the intermediary 418, the message is allowed to access the web service 414. If the message is not validated, the intermediary 418 blocks the message. The intermediary 418 also logs the event as configured by policy and/or systems management.

In a fourth illustrative use case, a web service 414 attempts to forward an outbound message to an application specific web service 422 in an application server 424. The intermediary 418 deployed in the application 416 intercepts the outbound message and injects into the message a security profile (which, in various embodiments comprises a Security Assertion Markup Language token) including the user, message and destination service for that message. The combination of data that makes up the security profile may be extracted from the instances stored in the intermediary. Optionally, the intermediary 426 at the destination may re-validate the security profile of the invoking user for the message as compared against the security profile of the destination web service. If the extracted security profile is not consistent, the intermediary 426 in the Proxy may block the message. The revalidation is optional in that the intermediary 426 in the Proxy performs identical validation checks at the receiving end, i.e., the destination service. As before, the intermediary (either at the source 418 or at the destination 426, or both) may also audit and log the message and the validation events according to policy and/or systems management.

In a fifth illustrative use case, an attack from the inside occurs when an attacker 428 attempts to directly access an application specific web service 422. As described above in other use cases, the intermediary 426 intercepts the message, and determines that, by virtue of being a malicious message, it lacks the inserted security profile that would be present if it were a trusted message. Accordingly, the intermediary 426 denies the message access to the application specific web service 422. Attempts to forge or spoof the injected security profile can be detected upon failing cryptographic tests (i.e., a decrypt failure, a signature failure, or a message digest failure, as known in the art), or upon containing an inconsistent security profile (i.e., forged, invalid, or null). The messaging activity, whether valid or invalid is logged.

In a sixth illustrative use case, an authorized user 430 attempts to access a web service 414 via a corporate portal 432. The web service 414 sought may include a commercial, off-the-shelf web service. The security portal plug-in, i.e., software intermediary 434 deployed within the corporate portal 432 intercepts the message from the authorized user 430, and assesses the validity of the message by inquiring at the enterprise level, via the SSOA Server 408, wherein the message is examined at the message level for the data, service, and user security profile for the message, the identity of the destination service, and the identity of the invoking user. The message is denied if the security profile extracted is not consistent, i.e., the requested combination of user, data, and service is not recognized or authorized for the service. The intermediary 434 in the Portal then accesses the existing Enterprise Identity Management Services 410 to conduct authentication of the invoking authorized user 430. If, in the course of these two validation tests, the intermediary 434 in the Portal determines that the message is, in fact, legitimate, the intermediary 434 in the Portal creates, signs, time stamps, and injects a security profile accordingly into the message. As previously discussed, the intermediary 434 in the Portal also performs logging and auditing per policy and/or systems management.

In a seventh illustrative use case, a message (updated by the intermediary 434 with an injected security profile), is routed to a web service 414, where the intermediary 418 associated with the web service 414 validates the injected security profile (which may comprise an SAML token, for example) which reflects the identity of the invoking user, data such as the message payload, and the identity of the destination service. If the security profile in the message is valid, when compared to that stored for the destination web service 414, the message will be permitted to access the destination web service 414. Otherwise, the message will be blocked. Whether the access is permitted, the messaging activity is logged.

General Purpose Computer Implementation

Figure 5:
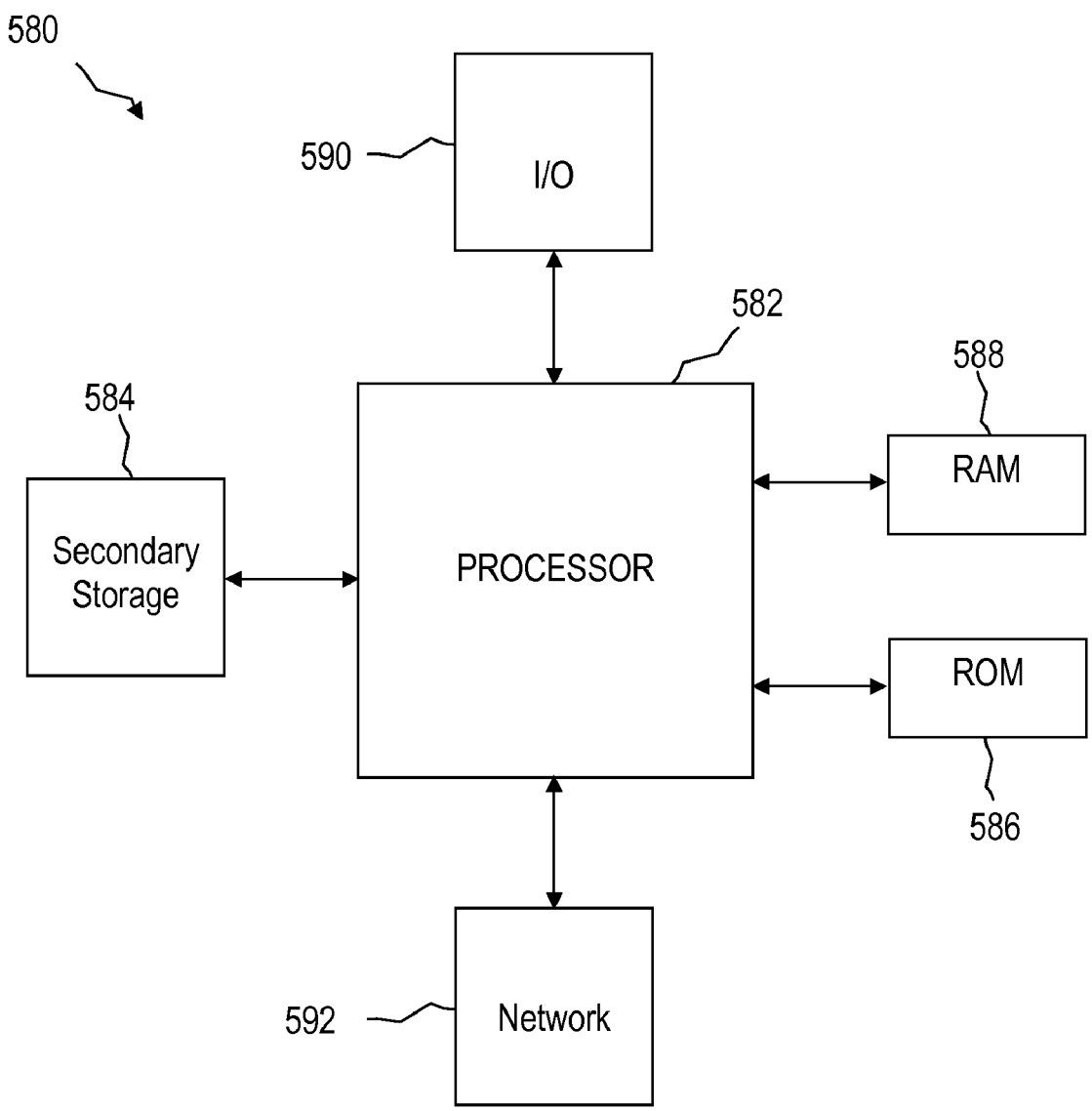
FIG. 5 shows an illustrative general purpose computer system suitable for implementing, at least in part, the embodiments of the disclosure.

The present disclosure may be implemented, at least partially, on a server or on any general-purpose computer(s) with sufficient processing power, memory resources, and network throughput capability to handle the necessary workload placed upon it, including a server. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, reads only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are reads during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, the network connectivity devices 592, or other computer readable media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of controlling and securing a service oriented architecture, comprising:
   a plurality of intermediaries, one intermediary for each web service of a plurality of web services, each intermediary intercepting a message between a requesting web service and a source web service, and each intermediary being associated with a requesting web service or a source web service;
   each intermediary validating the message;
   each intermediary logging a result of the validation;
   each intermediary examining the message to determine whether a security profile is embedded therein, wherein the security profile comprises a data security privilege, a services security privilege, and a user security privilege determined based on a security policy;
   each intermediary adding a security profile to the message if a security profile is not already present; and
   when a security profile is embedded in the message, each intermediary validating the message comprises comparing the security profile embedded in the message with a second security profile associated with the requesting web service, said second security profile also comprising a data security privilege, a services security privilege, and a user security privilege.

2. The method of claim 1, wherein if no security profile is embedded in the message, validating the message comprises: authenticating a user associated with the requesting web service; and, if the user is legitimate, creating a security profile and embedding the security profile in the message.

3. The method of claim 1, wherein if the message is valid, permitting access to the message by the requesting web service.

4. The method of claim 1, wherein if the message is not valid, preventing access to the message by the requesting web service.

5. The method of claim 1, further comprising:
   generating a new message capable of being requested by the requesting web service;
   defining a security profile; and
   embedding the security profile in the message such that the message may be validated when requested by the requesting web service.

6. A computer-readable medium storing a software program that, when executed by a processor, causes the processor to:
   intercept a message between a requesting web service and a source web service;
   validate the message;
   log a result of the validation;
   examine the message to determine whether a security profile is embedded therein, wherein the security profile comprises a data security privilege, a services security privilege, and a user security privilege determined based on a security policy;
   add a security profile to the message if a security profile is not already present; and
   when a security profile is embedded in the message, validate the message by comparing the security profile embedded in the message with a second security profile associated with the requesting web service, said second security profile also comprising a data security privilege, a services security privilege, and a user security privilege;
   wherein the software operates as an intermediary, and wherein the intermediary is associated with either the requesting web service or the source web service.

7. The computer-readable medium storing a software program of claim 6, that, when executed, further causes the processor to examine the message to determine whether a security profile is embedded therein.

8. The computer-readable medium storing a software program of claim 6, wherein if a security profile is not embedded in the message, the program further causes the processor to validate the message by authenticating a user associated with the requesting web service; and, if the user is legitimate, create a security profile and embedding the security profile in the message.

9. The computer-readable medium storing a software program of claim 6, wherein if the message is valid, the program further causes the processor to permit access to the message by the requesting web service.

10. The computer-readable medium storing a software program of claim 6, wherein if the message is not valid, the program further causes the processor to prevent access to the message by the requesting web service.

11. The computer-readable medium storing a software program of claim 6, that, when executed, further causes the processor to:
    generate a new message capable of being requested by the requesting web service;
    define a security profile; and
    embed the security profile in the message such that the message may be validated when requested by the requesting web service.

12. The computer-readable medium storing a software program of claim 6, wherein the security profile is based on a security policy.

13. A computer system organized according to a secure service oriented architecture, comprising:
    at least one computer on which a plurality of web services are implemented to pass data messages between the web services; and
    at least one computer on which a plurality of intermediaries are implemented;
    wherein each web service is coupled for communication of data messages through an intermediary, each web service associated with a different intermediary; and
    wherein each of the plurality of intermediaries performs a method comprising:
      intercepting a message between a requesting web service and a source web service;
      validating the message;
      logging a result of the validation;
      examining the message to determine whether a security profile is embedded therein, wherein the security profile comprises a data security privilege, a services security privilege, and a user security privilege determined based on a security policy;
      adding a security profile to the message if a security profile is not already present; and
      when a security profile is embedded in the message, validating the message by comparing the security profile embedded in the message with a second security profile associated with the requesting web service said second security profile also comprising a data security privilege, a services security privilege, and a user security privilege.

14. The computer system of claim 13, wherein:
    if a security profile is not embedded in the message, each intermediary is further operable to validate the message by authenticating a user associated with the requesting web service; and, if the user is legitimate, create a security profile and embedding the security profile in the message.

15. The computer system of claim 13, wherein each intermediary is further operable to:
generate a new message capable of being requested by the requesting web service;
define a security profile; and
embed the security profile in the message such that the message may be validated when requested by the requesting web service.

16. The computer system of claim 13, wherein each intermediary communicates with the other intermediaries to maintain an architecture-level data engine populated with security profiles for messages and services within the architecture.

17. The computer system of claim 13 wherein the security profile comprises a data security permission, a services security permission, and a user security permission determined based on a security policy.

* * * * *